United States Patent
Burman et al.

(10) Patent No.: US 11,748,115 B2
(45) Date of Patent: Sep. 5, 2023

(54) APPLICATION AND RELATED OBJECT SCHEMATIC VIEWER FOR SOFTWARE APPLICATION CHANGE TRACKING AND MANAGEMENT

(71) Applicant: ServiceNow, Inc., Santa Clara, CA (US)

(72) Inventors: Jacob Burman, San Diego, CA (US); Michel Abou Samah, San Diego, CA (US); Kylin Follenweider, San Diego, CA (US); Sharon Elizabeth Carmichael Ehlert, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 427 days.

(21) Appl. No.: 16/934,356

(22) Filed: Jul. 21, 2020

(65) Prior Publication Data
US 2022/0027169 A1 Jan. 27, 2022

(51) Int. Cl.
*G06F 9/445* (2018.01)
*G06F 8/77* (2018.01)
*G06F 8/34* (2018.01)

(52) U.S. Cl.
CPC .......... *G06F 9/44505* (2013.01); *G06F 8/34* (2013.01); *G06F 8/77* (2013.01)

(58) Field of Classification Search
CPC .......... G06F 9/44505; G06F 8/43; G06F 8/77
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

"Orlando IT Operations Management", ServiceNow Docs, Jun. 18, 2020, 573 pages.

(Continued)

*Primary Examiner* — Tammara R Peyton
(74) *Attorney, Agent, or Firm* — McDonnell Boehnen Hulbert & Berghoff LLP

(57) ABSTRACT

A system could include persistent storage containing application components. A plurality of software applications could be installed on the system. The software applications could be respectively associated context records that include references to application components that provide some behavior or data for the software applications. The system could also include processors configured to perform operations. The operations could include receiving a request to generate a topology map for a software application and identifying, based on a context record for the software application, a subset of application components that provide some behavior or data for the software application. The operations could further include determining relationship types between pairs of application components and generating a topology map for the software application. The subset of application components may be represented as nodes in the topology map, and edges between the nodes may be defined from relationship types between corresponding pairs of application components.

18 Claims, 15 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,742,940 B1 | 6/2010 | Shan |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,606,583 B2 * | 3/2020 | Benedetti ............ G06F 9/44505 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0050273 A1 | 3/2007 | Burke, Jr. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0300963 A1 | 12/2008 | Seetharaman |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0299433 A1 | 11/2010 | De Boer |
| 2013/0246106 A1 * | 9/2013 | Kroetsch ................ G06Q 10/06 705/7.12 |
| 2014/0222511 A1 | 8/2014 | Broady |
| 2017/0032400 A1 | 2/2017 | Gilmore |
| 2018/0158079 A1 | 6/2018 | Chu |
| 2020/0279198 A1 | 9/2020 | Turner |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Office Action, U.S. Appl. No. 17/211,539, dated Apr. 14, 2023.

Hyndman, R.J., & Athanasopoulos, G. (2018) Forecasting: principles and practice, 2nd edition, OTexts: Melbourne, Australia. OTexts.com/fpp2, chapter 3.1.

Office Action, U.S. Appl. No. 17/211,539, dated Jan. 11, 2023.

* cited by examiner

APPLICATION AND RELATED OBJECT SCHEMATIC VIEWER FOR SOFTWARE APPLICATION CHANGE TRACKING AND MANAGEMENT

BACKGROUND

A remote network management platform may support the creation of custom software applications for enterprise users. These custom applications can range from simple web forms to workflow management and other productivity tools. To facilitate rapid development of such applications, the remote network management platform may support a set of application components. For example, these application components may include a set of widgets for graphical user interface (GUI) development.

SUMMARY

A remote network management platform could offer various pre-constructed software applications. Such pre-constructed software applications could include, for example, device and software discovery applications, service mapping applications, information technology (IT) operations and service management applications, machine learning applications, and so on. These pre-constructed software applications could be developed by developers or operators of the remote network management platform or by a third-party entity.

Occasionally, however, an enterprise user could have a unique requirement that cannot be addressed by any of the pre-constructed software applications offered by the remote network management platform. For instance, if the enterprise user frequently engages in telemarketing, then the enterprise user may require a custom telemarketing management application. To handle this scenario, the remote network management platform may support the creation of custom software applications. These custom software applications could be new software applications or could be built on top of existing, pre-constructed software applications. Further, these custom software applications may be executable within the remote network management platform, and could thus take full advantage of the infrastructure and computational services offered by the remote network management platform.

To facilitate the development of custom software applications, the remote network management platform may support a set of application components, such as widgets for GUI development, pre-populated database tables containing records, user authentication services, and the like. Such application components could eliminate unnecessary development complexity and enable applications built using the remote network management platform to have a common look and feel.

A custom software application could have hundreds, if not thousands, of these application components. Each application component could be configured to provide a specific service and could be interconnected with one or more other application components to provide a compound service. For instance, a first application component could pass data to a second application component, which in turn may perform processing on the data and pass the processed data to a third application component. Yet, while the services of an individual application component can be viewed, the services that application components provide in combination may not be apparent by examining any one thereof.

To address this issue, the present disclosure provides for the concept of an "application topology map." As detailed below, an application topology map could be a visual representation specifying the application components that contribute to a software application. The application topology map could depict the application components as nodes in a graph, with edges in the graph representing logical dependencies between the application components. Advantageously, the application topology map can help an enterprise user understand the application components impacted, for example, by a failed application component or by an application component that is to be taken out of service for an upgrade. The application component map could also help the enterprise user determine the root cause of a problem that impacts the performance or availability of an application component within the software application.

In accordance with the disclosure, the remote network management platform could include an application topology tool that could generate application topology maps for software applications installed on the remote network management platform. During operations, the application topology tool could identify, from an application context record associated with a given software application, the various application components that form the given software application. With the application components identified, the application topology tool could then determinate relationships between the various application components. Finally, by exploring those determined relationships, an application topology map for the given software application could be produced.

Accordingly, a first example embodiment may involve a system that includes persistent storage containing application components. A plurality of software applications may be installed on the system. The plurality of software applications may be respectively associated with application context records that include references to one or more of the application components that provide at least some behavior or data related to the plurality of software applications. The system may also include one or more processors configured to perform operations. The operations may include receiving, from a client device, a request to generate an application topology map for a software application from the plurality of software applications. The operations may further include identifying, based on an application context record associated with the software application, a subset of application components that provide at least some behavior or data related to the software application. The operations may also include determining, based on the subset of application components, relationship types between pairs of application components from the subset of application components. The operations may additionally include generating an application topology map for the software application, where the subset of application components are represented as nodes in the application topology map, and where edges between the nodes are defined based on the relationship types between corresponding pairs of application components. The operations may also include providing, for display on the client device, a representation of the application topology map.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
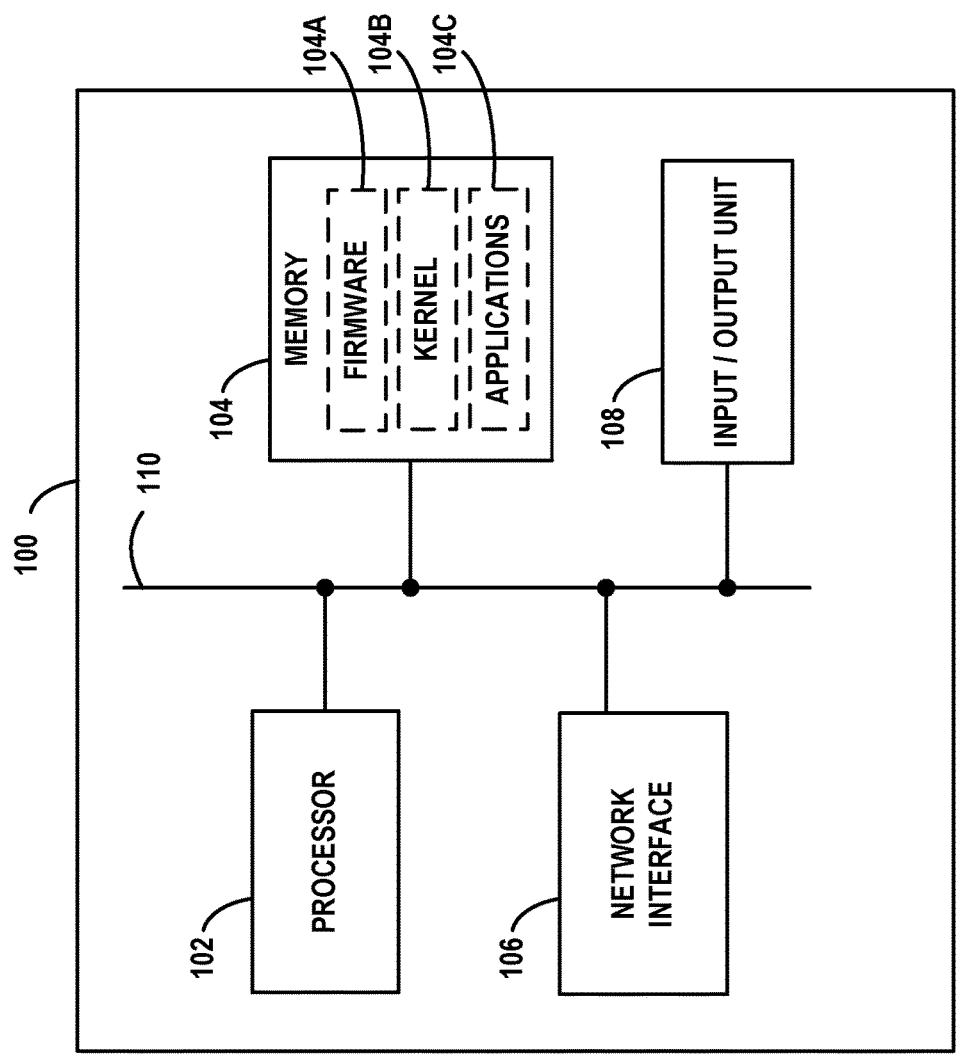
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
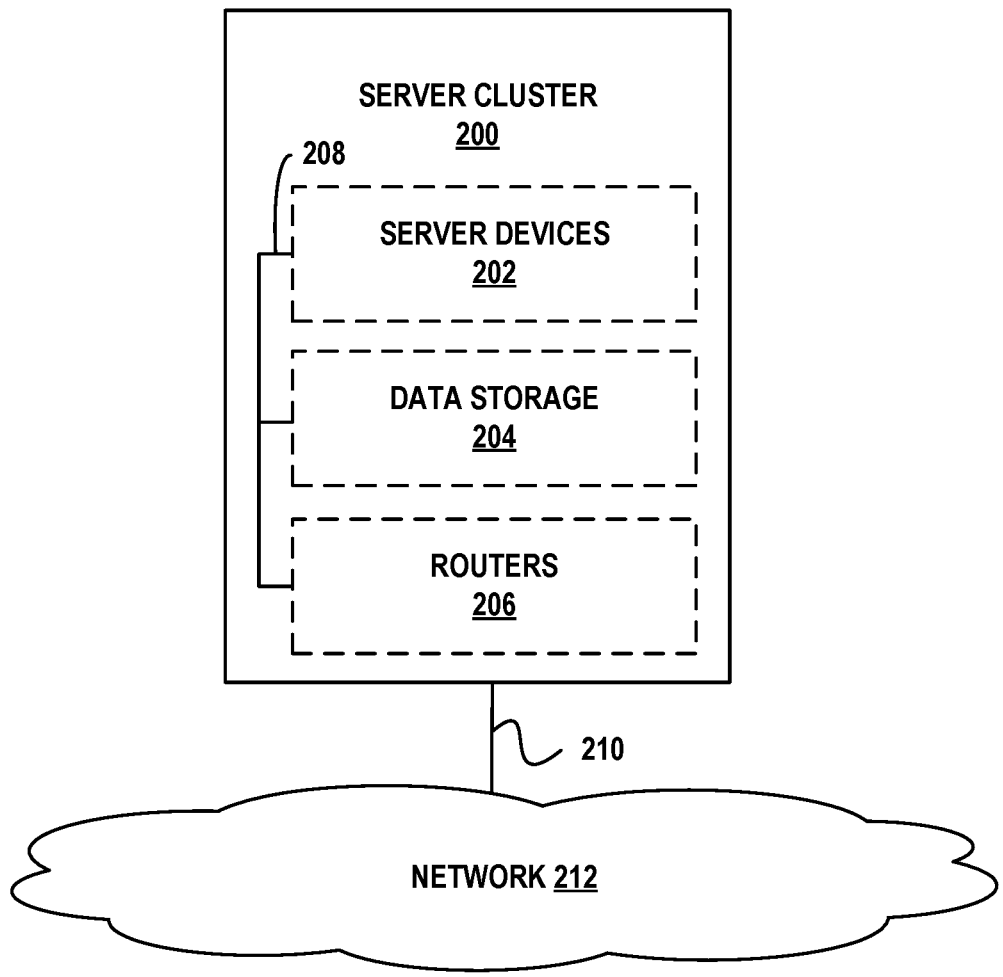
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PUP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
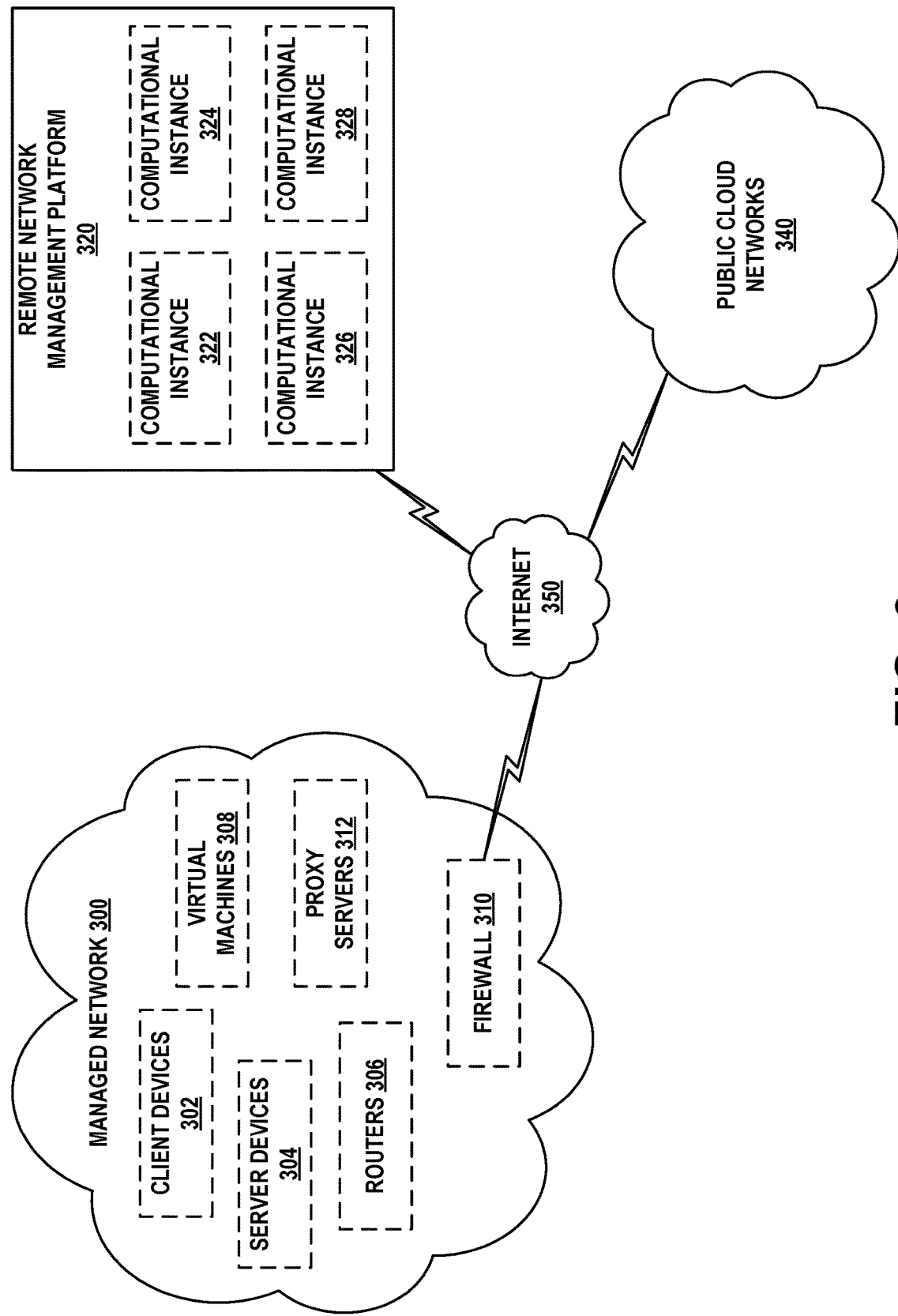
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
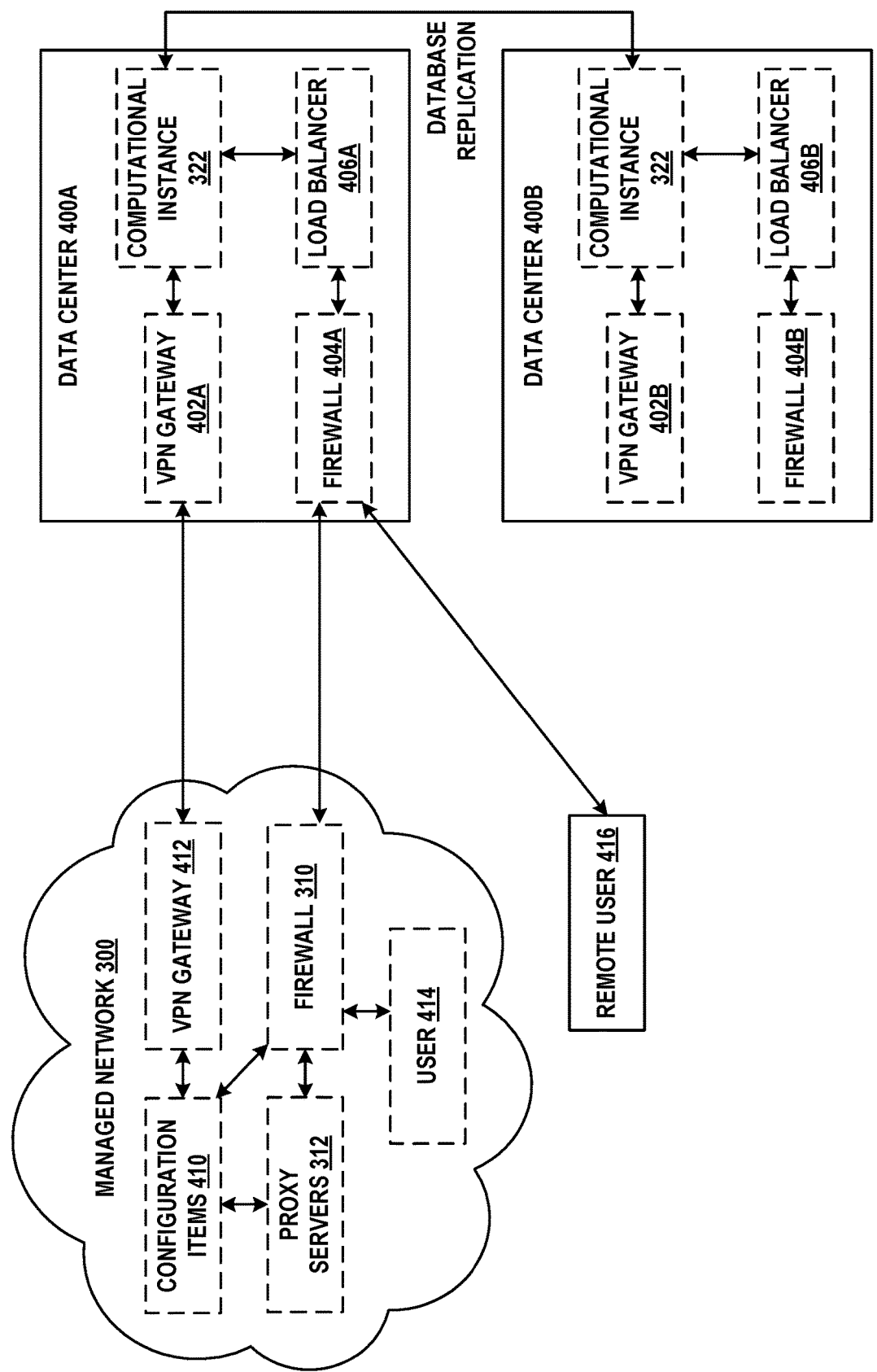
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
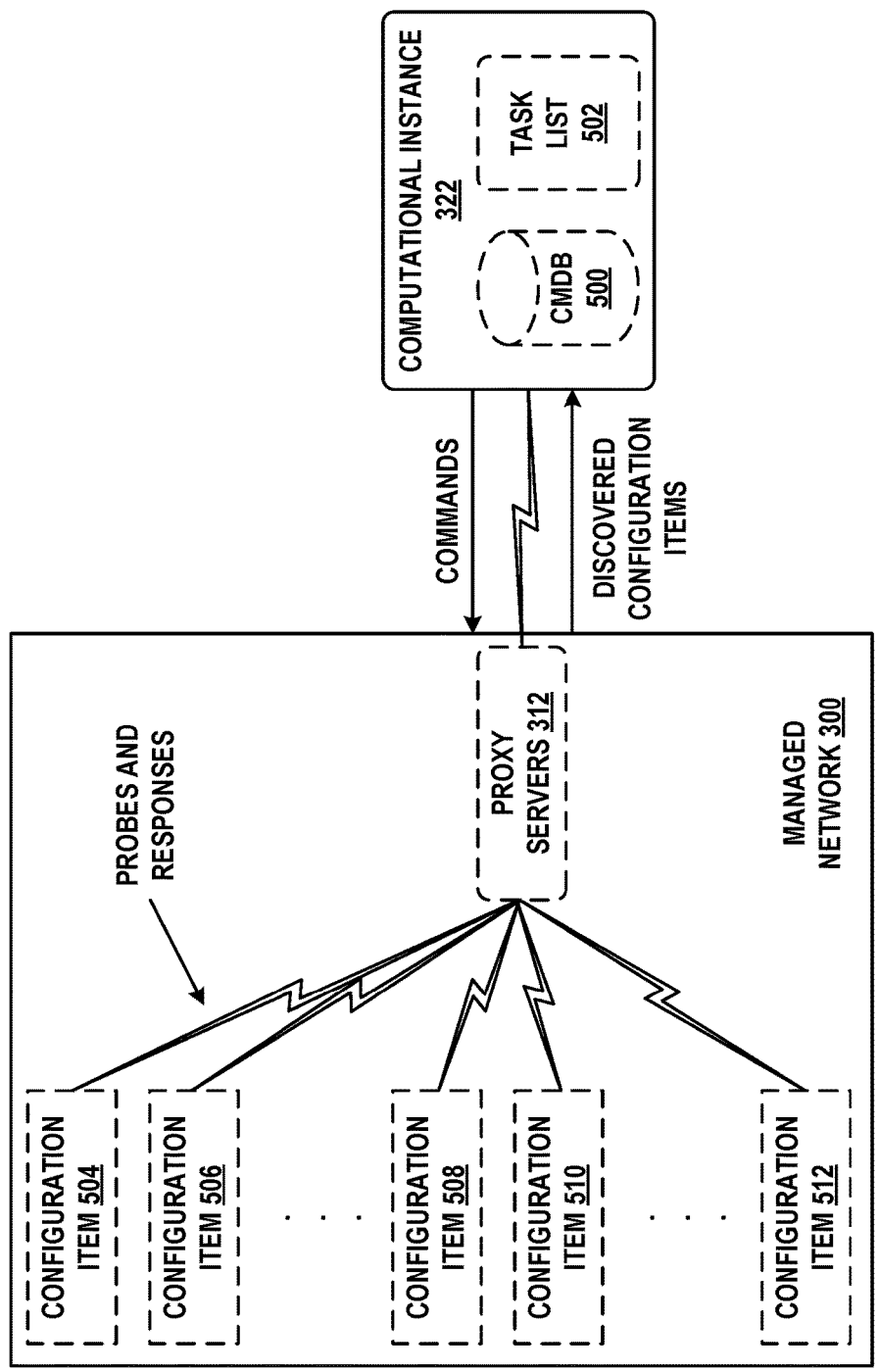
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
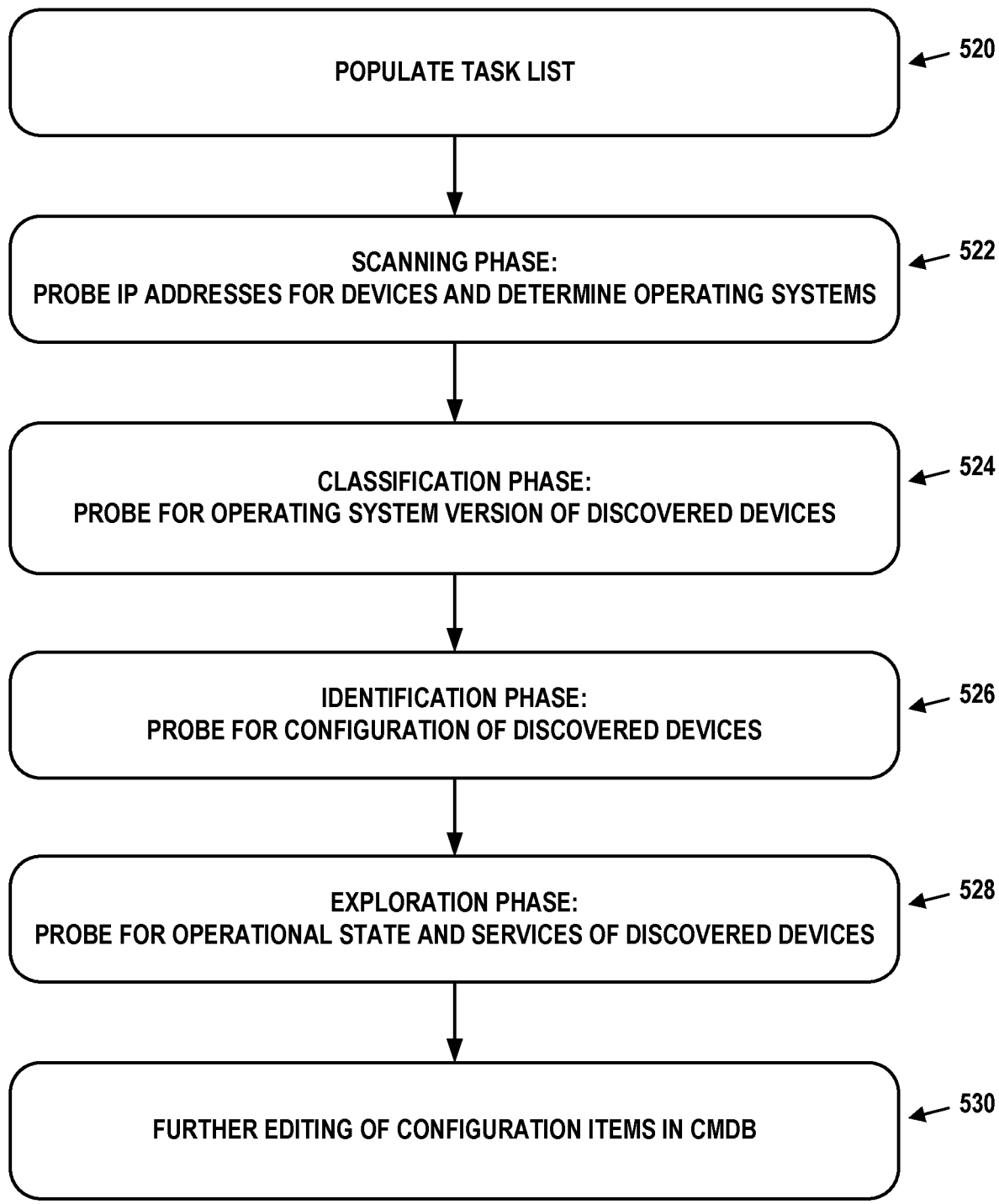
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Application Topology Maps

Figure 6A:
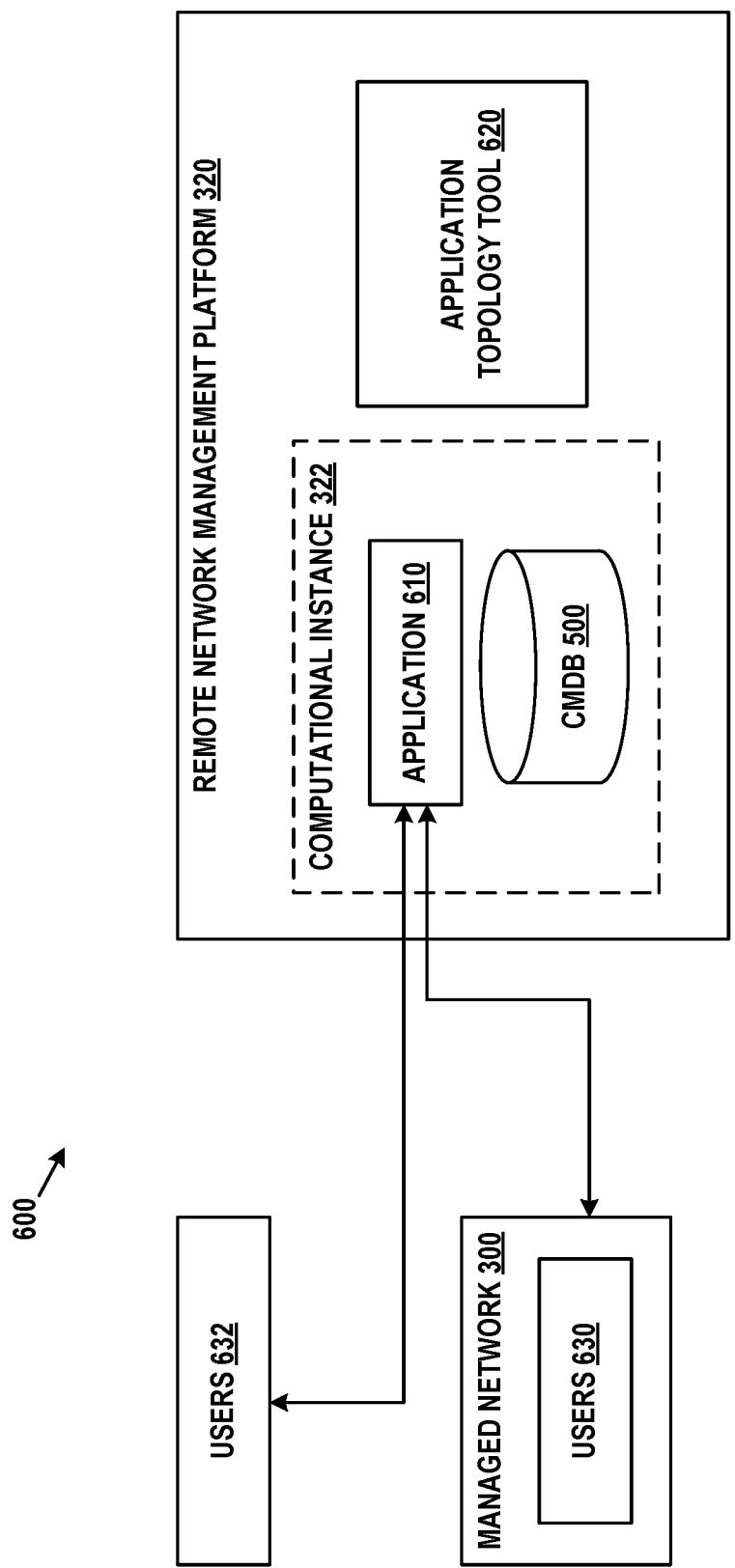
FIG. 6A depicts a network architecture, in accordance with example embodiments.

FIG. 6A depicts network architecture 600, in accordance with example embodiments. Network architecture 600 includes managed network 300 and remote network management platform 320, which may be communicatively connected by way of a network, such as Internet 350.

Managed network 300 may be an enterprise network used by an entity for computing and communication tasks, as well as storage of data. In examples, managed network 300 may utilize one or more of the software applications contained within computational instance 322.

Users 630 and users 632 can represent people or sources (e.g., another enterprise) that use software applications provided by computational instance 322. In example embodiments, users 630 may represent people that work for the entity associated with managed network 300, such as engineers, scientists, managers, accountants, financial analysts, IT staff, and so on, whereas users 632 may correspond to people outside of the entity associated with managed network 300. For simplicity, examples will be described using users 630. However, the disclosed principles could apply in other scenarios with other users as well.

Computational instance 322 may be disposed within remote network management platform 320 and may be dedicated to managed network 300. Computational instance 322 may store, in CMDB 500, discovered configuration items that represent the environment of managed network 300. Additionally, computational instance 322 may include one or more software applications installed therein, such as application 610. These software applications could provide various types of services. For example, application 610 could be designed to manage and resolve incidents related to various assets (e.g., server devices, printing devices, or another configuration items) operating within managed network 300.

The software applications installed within computational instance 322 could be developed by remote network management platform 320, users 630, or some other third-party entity. Further, in line with the discussion above, the software applications installed within computational instance 322 could be formed from one or more application components.

Figure 6B:
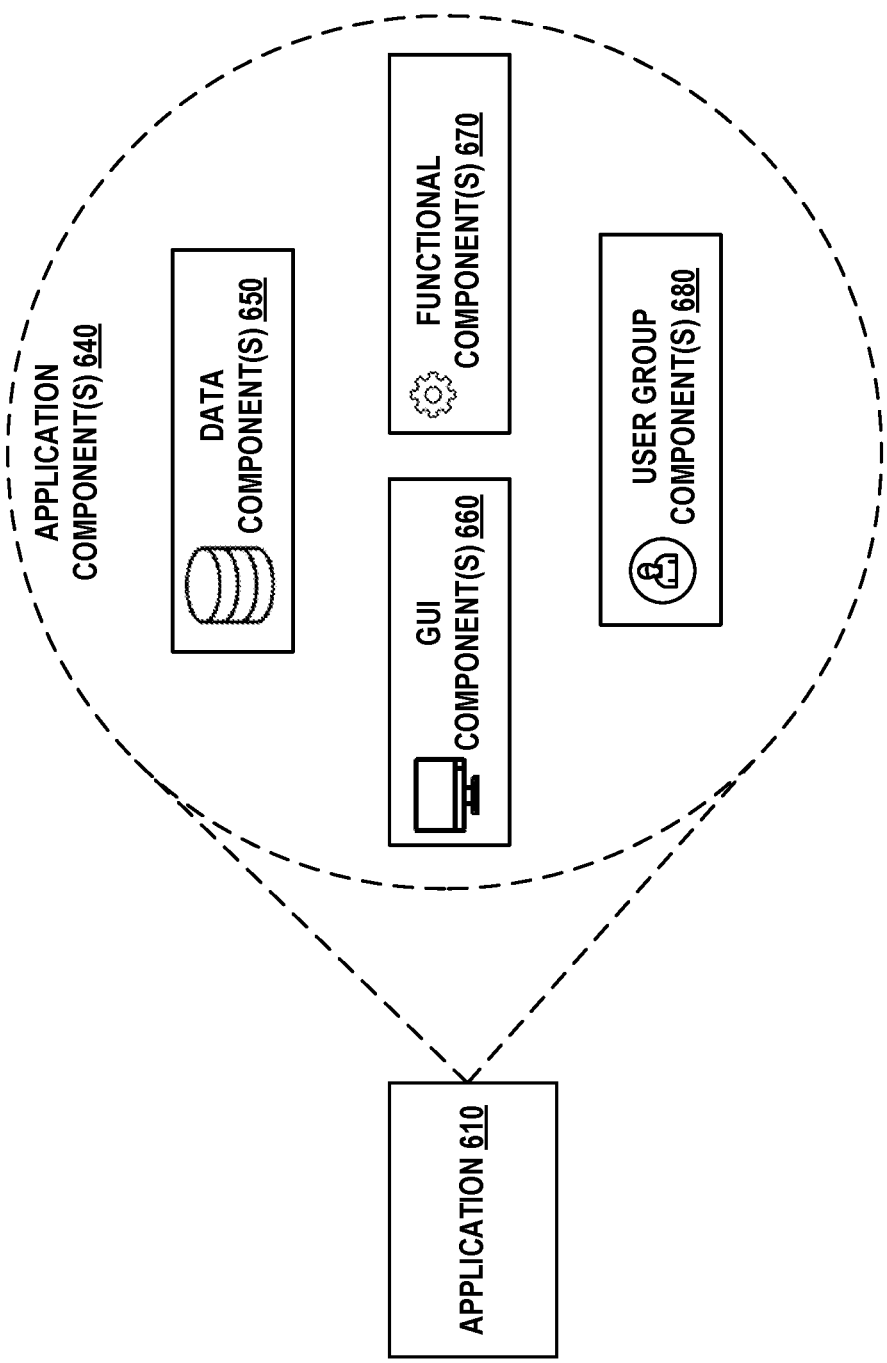
FIG. 6B depicts example application components, in accordance with example embodiments.

FIG. 6B includes a call out of application 610 that demonstrates how application 610 could be formed from one or more application components 640. As used herein, an application component may include a software module that encapsulates at least some of the behavior or data related to a software application. An application component could provide one or more functions for a software application and/or may communicate with other application components to provide compound functions for the software application.

In some embodiments, remote network management platform 320 could provide a set of pre-configured application components for software application development. For instance, remote network management platform 320 could provide a pre-configured authentication component that verifies user identities. Accordingly, when creating a software application, an application developer could utilize the pre-defined authentication component rather than developing a new authentication component.

Alternatively, application developers could create their own application components. The application developers could create application components from scratch or from templates provided by remote network management platform 320. For example, remote network management platform 320 may provide a standardized set of widgets for creating graphical user interface (GUI) components, and an application developer may utilize the standardized set of widgets when creating GUI components for a software application.

Application components could be reusable. For instance, an application developer could use a data component containing financial records for both an auditing software application as well as a financial reporting software application.

Application components could have limits to the extent of their customization. For example, remote network management platform 320 could dictate that all application components must be created using a set of N pre-defined functions. While numerous application components could be created from the set of N pre-defined functions, the extent of customization of those applications is nonetheless limited by the set of N pre-defined functions.

In example embodiments, application components could be stored within remote network management platform 320, perhaps in CMDB 500 or another database. In order to use an application component, a software application may reference the location of the application component within remote network management platform 320. Such references could be contained in an application context record associated with the software application, further details of which are provided below.

Various types of application components may exist. For instance, in FIG. 6B, application component(s) 640 are shown to include one or more data components 650, one or more GUI components 660, one or more functional components 670, and one or more user group components 680.

Data component(s) 650 may be application components that allow for persistent storage of data related to application 610. For instance, a data component may take the form of a database table physically disposed on CMDB 500 or perhaps another database within remote network management platform 320.

GUI component(s) 660 may be application components that allow users to engage with application 610. For instance, a GUI component may contain one or more locations in which to display information, and/or one or more user-selectable items such as buttons or tabs. GUI components can take on many forms. Some GUI components may be, for instance, web-based GUI components that can be displayed on a screen of a computing device. In some cases, GUI components may be built using a standardized set of widgets that are provided by remote network management platform 320.

Functional component(s) 670 may be application components that contain any form of source code, object code, machine code, executable instructions, build instructions, configuration instructions, or data that is used to compile and/or execute application 610. For instance, a functional component may take the form of a shell script that, when executed, accomplishes one or more goals.

User group component(s) 680 may be application components that associate users of application 610 in some fashion (e.g., based on the type of the user, geographic location of the user, and/or the job function of the user). For instance, a user group component may encompass users of application 610 that are part of a human resource (HR) department, whereas another user group component may encompass users of application 610 that are part of a finance department. Various permissions could be assigned to a user group component. For example, the finance user group component may be granted access to financial documents disposed within application 610, whereas the HR user group component might not be granted access to these documents.

Notably, data component(s) 650, GUI component(s) 660, functional component(s) 670, and user group component(s) 680 are presented for the purpose of example and are not intended to be limiting with respect to the embodiments herein. In practice, application component(s) 640 could include other types of application components, or perhaps a different set of application components than shown in FIG. 6B.

Referring back to FIG. 6A, application topology tool 620 may be disposed within remote network management platform 320. Application topology tool 620 could take the form of a background process, an executable application, or the like. Application topology tool 620 may be granted access to data associated with various software applications installed within computational instance 322. For simplicity, examples will now be described using application 610 and data related to application 610. However, the disclosed principles could apply in other scenarios with other software applications as well.

Application topology tool 620 could create an application topology map for application 610. This may involve, for example, application topology tool 620 obtaining information related to the application components of application 610 and then building an application topology map using those application components. In line with the discussion above, an application topology map may be a visual representation, on a web-based GUI for instance, that depicts the application components of application 610 as nodes in a graph. The edges of the graph may represent logical connectivity between those nodes. This visual representation allows users to rapidly determine the impact of a problematic application component on other application components of application 610. For instance, rather than viewing, in isolation, the properties of a data component, the data component can be represented as having connections to other components that rely upon or support the data component. Thus, if the data component is exhibiting a problem (e.g., has a software bug therein), the impacted application component(s) can be efficiently determined.

Figure 7:
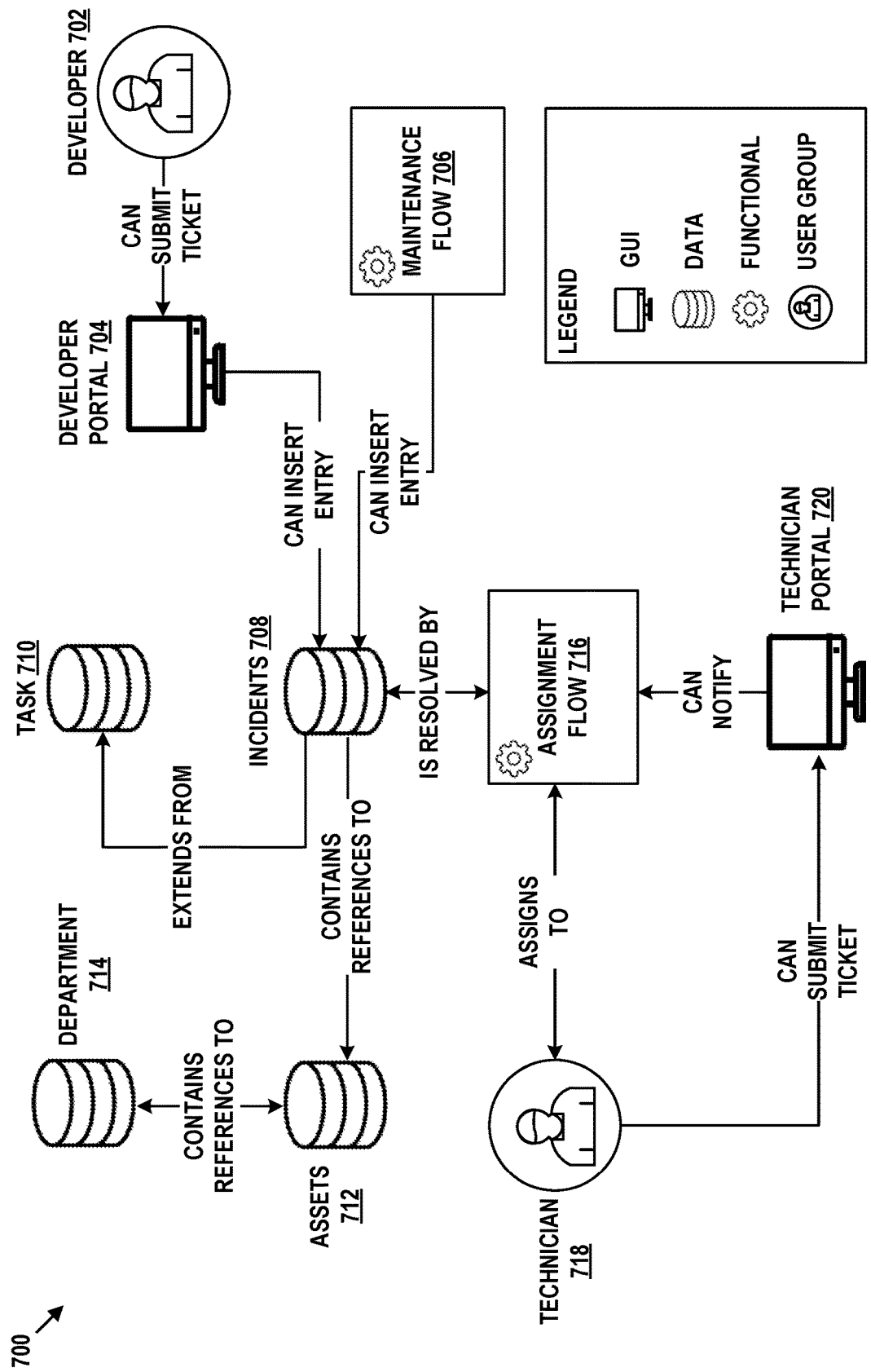
FIG. 7 illustrates an application topology map, in accordance with example embodiments.

FIG. 7 illustrates an example application topology map 700 for application 610, in accordance with example embodiments. The nodes in application topology map 700 may represent application components of application 610 and the edges in application topology map 700 may represent relationships between application components of application 610. Application topology map 700 may be generated for display on the screen of a computing device, such as computing device 100 or any client device that can access computational instance 322.

The nodes of application topology map 700 may take the form of icons related to the respective functions of application 610. These icons help communicate application component types. As shown in the legend, application topology map 700 uses four different icons: a screen icon, a database icon, a gear icon, and a person icon.

The screen icon may be used for nodes that relate to GUI components of application 610. In application topology map 700, developer portal 704 and technician portal 720 are both GUI components and thus are represented by a screen icon.

The database icon may be used for nodes that relate to data components of application 610. In application topology map 700, incidents table 708, assets table 712, and department table 714 are each data components and thus are represented by a database icon.

The gear icon may be used for nodes that relate to functional components of application 610. In application topology map 700, maintenance flow 706 and assignment flow 716 are each functional components and thus are represented by a gear icon.

The person icon may be used for nodes that relate to user group components of application 610. In application topology map 700, developer group 702 and technician group 718 are each user group components and thus are represented by a person icon.

Notably, the screen icon, the database icon, the gear icon, and the person icon are merely presented for the purpose of example and are not intended to be limiting with respect to the embodiments herein. Other types of icons that relate to other types of application components may also exist.

In line with the discussion above, application 610 may be designed to resolve incidents related to various assets (e.g., server devices, printing devices, or another configuration items) operating within managed network 300. Accordingly, the nodes and edges in application topology map 700 may help illustrate how application 610 actually achieves its designed objectives.

For instance, application topology map 700 contains developer group 702. Developer group 702 could be a user group component that encompasses application developers. These application developers may be responsible for creating and maintaining various software applications used by managed network 300. Further, these application developers may determine (e.g., perhaps while developing a software application) incidents related to assets on managed network 300. For instance, a member of developer group 702 may determine that a server device operating within managed network 300 is malfunctioning. Application topology map 700 shows that upon determining an incident, members from developer group 702 may submit a ticket through developer portal 704.

Developer portal 704 could be a GUI component that contains input fields for submitting tickets. Upon receiving a ticket from a member of developer group 702, application topology map 700 shows how developer portal 704 could insert a corresponding entry for that ticket in incidents table 708. In practice, developer portal 704 could do this by initiating a POST request to an application programing interface (API) endpoint associated with incidents table 708. However, other ways of inserting entries are also possible.

Alternatively and/or additionally, application topology map 700 shows that entries in incidents table 708 could be inserted via maintenance flow 706. Maintenance flow 706 may be a functional component that continuously monitors the health of various assets disposed within managed network 300. Application topology map 700 shows that upon determining that an incident has occurred, maintenance flow 706 could insert a corresponding entry for that incident in incidents table 708.

Incidents table 708 may be a data component configured to store information related to various incidents. In practice, incidents table 708 could store this information in a series of rows and columns, with the rows corresponding to incidents and the columns corresponding to attributes of those incidents. The attributes may include, for example, the entity that reported the incident (e.g., the particular member from developer group 702), a timestamp for when the incident was submitted, and so on.

Application topology map 700 shows that incidents table 708 may extend from task table 710. That is, incidents table 708 may contain all of the attributes of task table 710 (however, task table 710 need not contain all of the attributes of incidents table 708.) In the present disclosure, such a relationship may be referred to as a "parent-child" relationship, with task table 710 being the "parent" and incidents table 708 being the "child". Additional details about "parent-child" relationships are provided below.

Application topology map 700 also shows that incidents table 708 may contain references to attributes of assets table 712. In the present disclosure, such a relationship may be referred to as a "reference" relationship, with incidents table 708 being the "referring" table and assets table 712 being the "referred to" table. Further, application topology map 700 shows that assets table 712 may contain references to department table 714. Additional details about "reference" relationships are provided below.

Application topology map 700 shows that assignment flow 716 could resolve incidents from incidents table 708. In examples herein, assignment flow 716 could be a functional component that assesses and assigns incidents in incidents table 708 to members of technician group 718. For instance, incidents table 708 may contain an attribute that indicates whether or not a given incident has been resolved. Assignment flow 716 could monitor that attribute and then, upon determining that an incident has yet to be resolved, could assign that incident to a member of technician group 718. Once the incident is resolved, assignment flow 716 could update incidents table 708. For instance, upon receiving a notification from technician portal 720 that the incident has been resolved by a member of technician group 718, assignment flow 716 could locate that incident in incidents table 708 and update that incident to indicate that the incident has been resolved.

Technician group 718 may be a user group component that encompasses technicians of managed network 300.

These technicians may be responsible for maintaining and supporting various assets disposed within managed network 300. Application topology map 700 shows how members of technician group 718 could be assigned by assignment flow 716 to address incidents from incidents table 708. For instance, a member of technician group 718 may be assigned to address an incident related to a server device operating within managed network 300. Application topology map 700 shows that upon resolving the incident (e.g., updating firmware, replacing a malfunctioning battery, etc.), members of technician group 718 may submit a ticket via technician portal 720.

Technician portal 720 may be a GUI component that contains input fields for submitting tickets. Application topology map 700 shows that upon receiving a ticket submission from a member of technician group 718, technician portal 720 could notify assignment flow 716. In practice, the notification could contain information on the resolved incident, including the timestamp for when the incident was resolved, the name of the technician assigned to the incident, and so on. To do this, technician portal 720 could initiate a POST request to an API endpoint associated with assignment flow 716. However, other ways of notifying assignment flow 716 are also possible.

Notably, the arrangement of application topology map 700 is used merely for purposes of illustration and is not intended to be limiting with respect to the embodiment herein. In practice, various arrangements of application topology map 700 may exist. For example, more or fewer nodes with potentially different edges may be present.

VI. Intelligent Determination of Application Topology Maps

Figure 8:
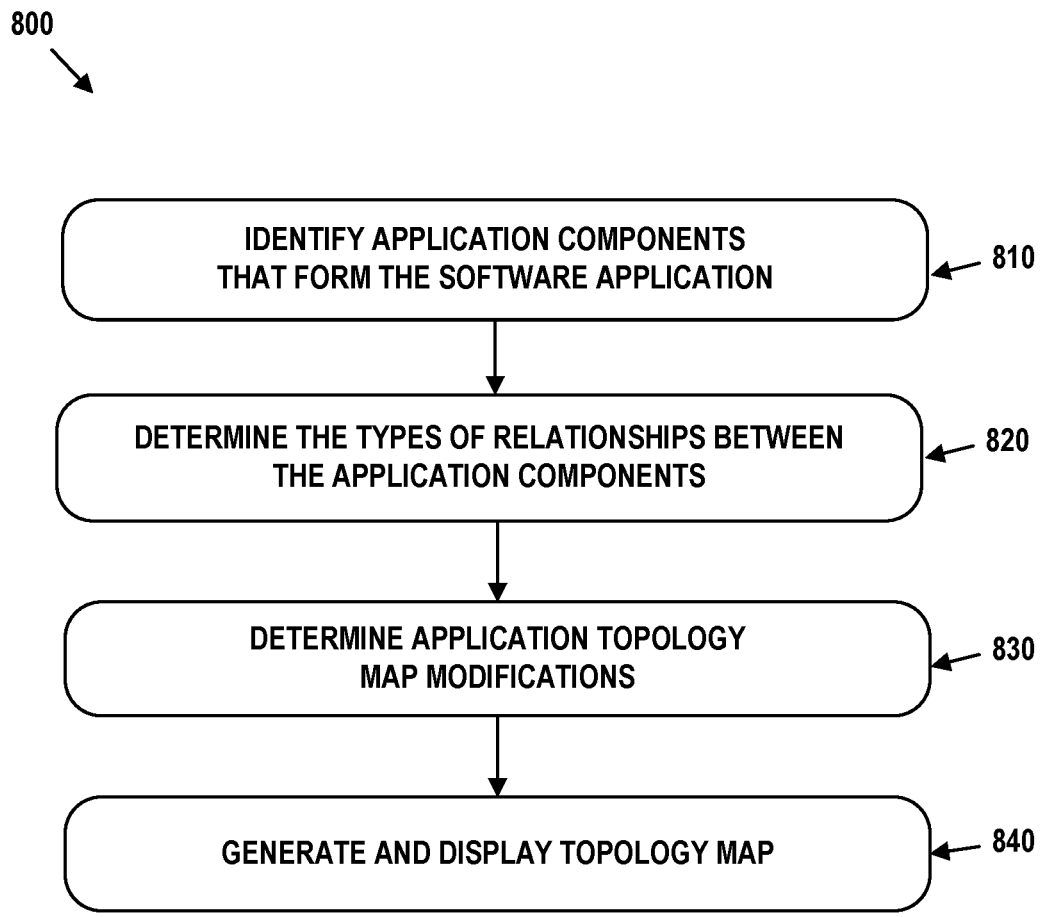
FIG. 8 is a flow chart illustrating example operations of a application topology tool, in accordance with example embodiments.

FIG. 8 illustrates procedure 800, in accordance with example embodiments. In some examples, application topology tool 620 could perform procedure 800 to generate application topology map 700 for application 610. Despite procedure 800 containing particular blocks arranged in a particular order, more or fewer blocks may be performed in a different order without departing from the embodiments herein.

Procedure 800 may begin at block 810, where application topology tool 620 identifies the application components that form application 610. To do this, application topology tool 620 could consult an application context record associated with application 610, although other ways of identifying application components are also possible.

Figure 9:
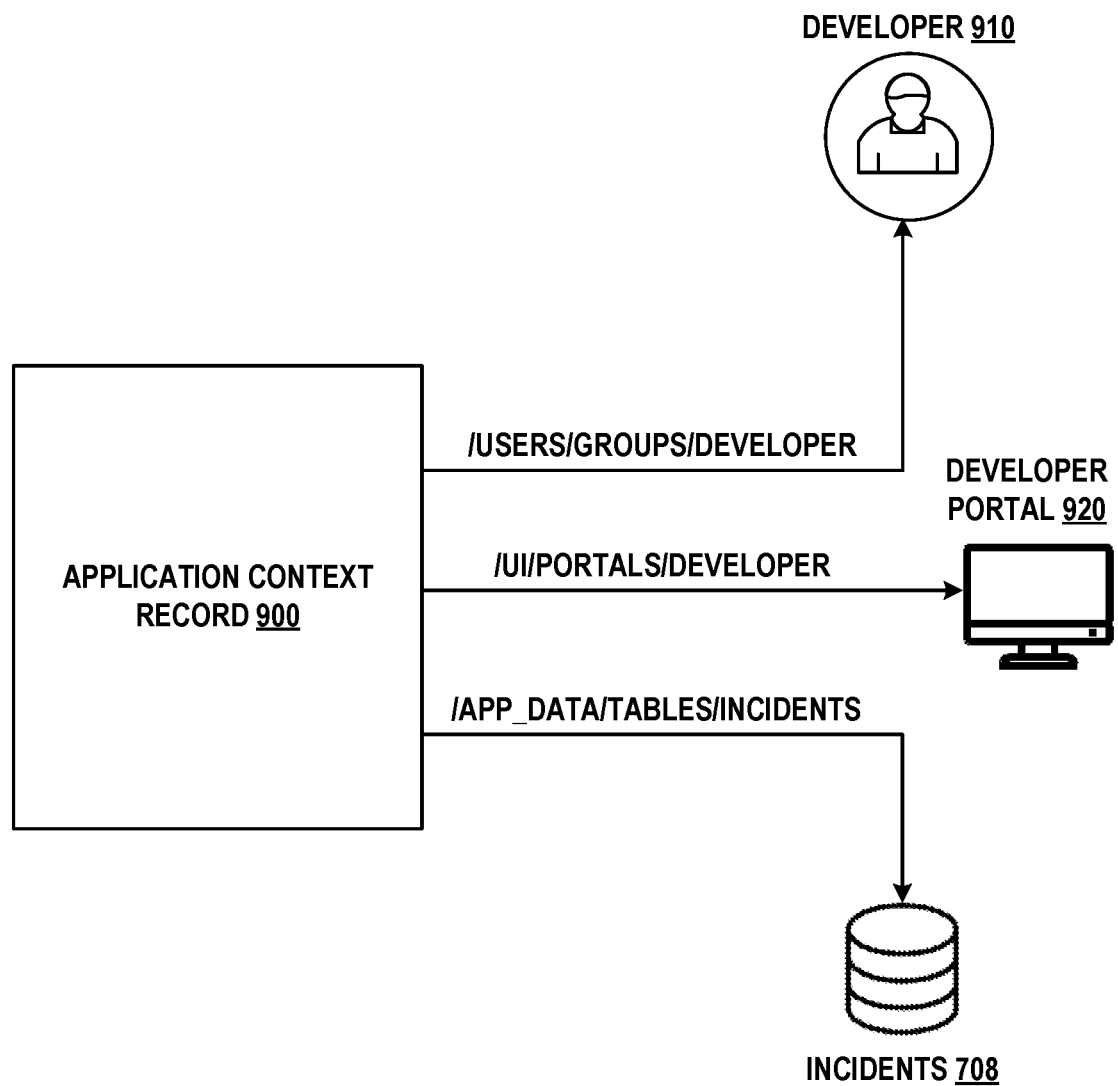
FIG. 9 depicts an application context record, in accordance with example embodiments.

As an example related to block 810, FIG. 9 contains application context record 900. In embodiments herein, application context record 900 could be a file, series of database tables, or the like that stores metadata related to application 610. For instance, application context record 900 could contain the name of application 610, the version of application 610, and so on. Application context record 900 could be disposed within remote network management platform 320, perhaps in CMDB 500 or another database.

In example embodiments, application context record 900 may contain references to the application components that form application 610. These references could take the form of path names to specific locations within remote network management platform 320. For example, application context record 900 could reference developer group 910 through the pathname "/USERS/GROUPS/DEVELOPER," reference developer portal 920 through the pathname "/UI/PORTALS/DEVELOPER," and reference incidents table 708 through the pathname "/APP_DATA/TABLES/INCIDENTS." Other ways of referencing application components are also possible.

Returning back to FIG. 8, at block 820, application topology tool 620 could determine the types of relationships between the application components identified at block 810. This could involve, for example, determining "parent-child" relationships between application components, "reference" relationships between application components, whether one application component extends from another application component, among other possibilities. Application topology tool 620 could determine the relationship types by analyzing schemas associated with the application components of application 610, source code files associated with the application components of application 610, or other pieces of data related to the application components of application 610.

Figure 10A:
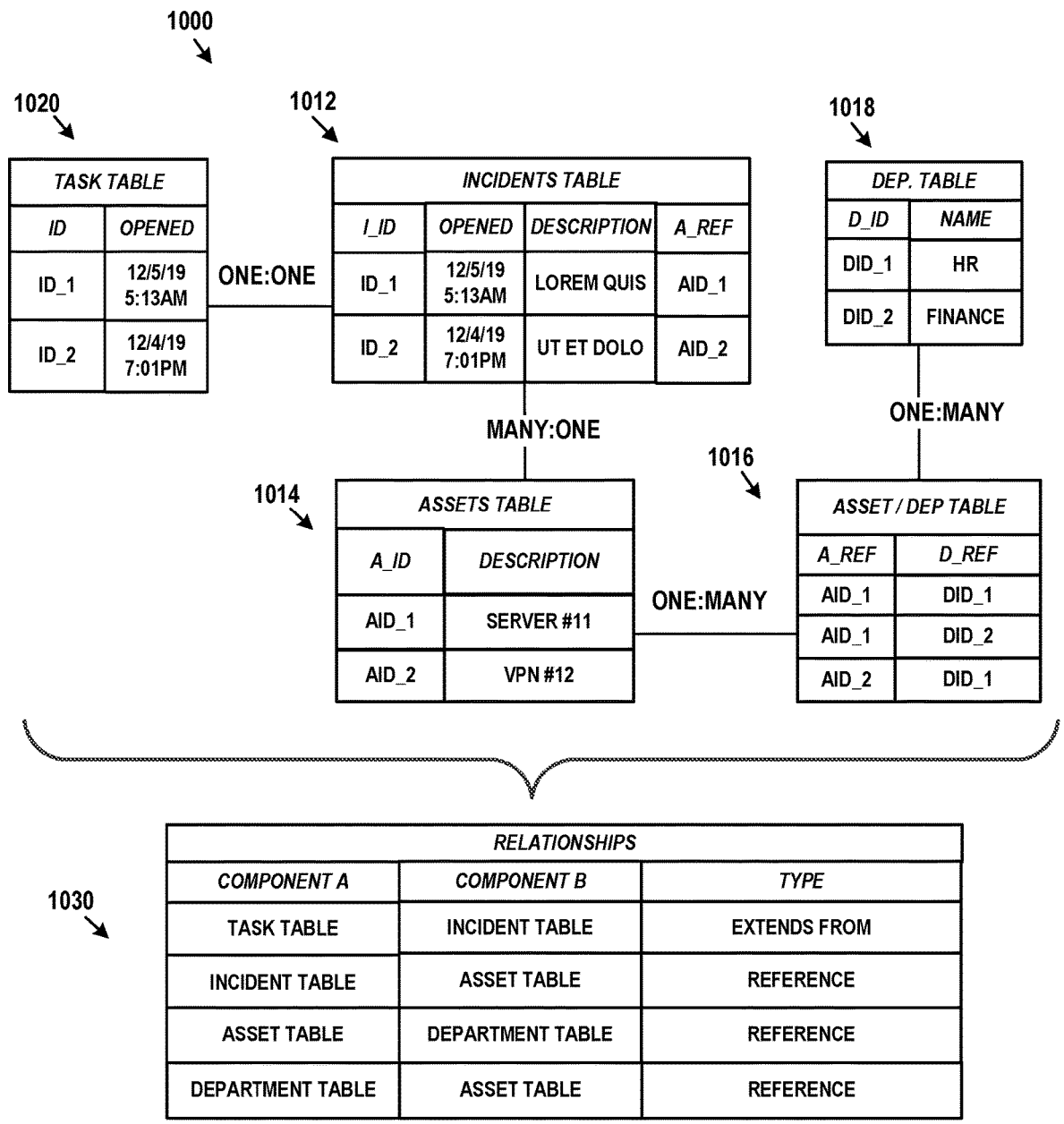
FIG. 10A illustrates a schema, in accordance with example embodiments.

As an illustrative example related to block 820, FIG. 10A shows an example schema 1000 that contains five tables: incidents table 1012, assets table 1014, assets/department table 1016, department table 1018, and task table 1020. Each of these tables may be configured and/or arranged by remote network management platform 320 or by users 630. For instance, task table 1020 and department table 1018 could be default database tables that are provided by remote network management platform 320, whereas incidents table 1012 and assets table 1014 could be database tables that are configured by users 630 for use in application 610.

Schema 1000 shows how incidents table 1012 has a one to one relationship with task table 1020 and a many to one relationship with assets table 1014. Schema 1000 also shows how assets table 1014 and department table 1018 have a many to many relationship that is facilitated via assets/department table 1016. These relationships may be configured and/or arranged by remote network management platform 320 or by users 630. For instance, the one to one relationship between incidents table 1012 and task table 1020 may be configured by users 630 upon the instantiation of incidents table 1012. In some implementations, users 630 could configure such relationships via a schema design tool provided by remote network management platform 320, or perhaps by other means.

In the examples herein, incidents table 1012, assets table 1014, department table 1018, and task table 1020 could be referenced by an application context record associated with application 610 and thus may be considered as application components of application 610. Accordingly, application topology tool 610 may be configured to analyze the relationships in schema 1000 and then store those relationships in relationship table 1030. For instance, to capture the relationship between incidents table 1012 and task table 1020, application topology tool 620 could add to relationship table 1030 an entry contains: (i) a reference to task table 1020, (ii) a reference to incidents table 1012, and (iii) the type of relationship between task table 1020 and incidents table 1012. Because task table 1020 has a one to one relationship with incidents table 1012 in schema 1000, the relationship type between task table 1020 and incidents table 1012 may be considered as a "EXTENDS FROM" relationship type. Similarly, to capture the relationship between incidents table 1012 and assets table 1014, application topology tool 620 could add to relationship table 1030 an entry contains: (i) a reference to incidents table 1012, (ii) a reference to assets table 1014, and (iii) the type of relationship between incidents table 1012 and assets table 1014. Because incidents table 1012 has a many to one relationship with assets table 1014 in schema 1000, the relationship type between incidents table 1012 and assets table 1014 may be considered as a "REFRENCE" relationship type.

Notice how schema 1000 contains assets/department table 1016, but application topology map 700 does not contain any nodes that correspond to assets/department table 1016. This is because application topology tool 620 could be configured to ignore such linking tables when generating application topology maps. Instead, application topology tool 620 may represent assets/department table 1016 as a bilateral relationship between assets table 1014 and department table 1018. That is, application topology tool 620 may add two entries in relationship table 1030 to capture assets/department table 1016: one entry where assets table 1014 "references" department table 1018, and one entry in which department table 1018 "references" assets table 1014.

During operations, application topology tool 620 could refer to the entries in relationship table 1030 to determine whether an edge should be displayed between the nodes of an application topology map. As discussed below, application topology tool 620 could visually depict a specific relationship type by using unique colors for the edges corresponding to that relationship type, using unique line format (e.g., a dash type, a line weight) for edges corresponding to that relationship type, or by including a textual description next to edges corresponding to that relationship type. For example, application topology tool 620 could visually distinguish a "parent-child" relationship between two application components using a red color for the edge, using a dashed line format for the edge, or by including a textual description next to the edge. Other ways of distinguishing relationship types are also possible.

Figure 10B:
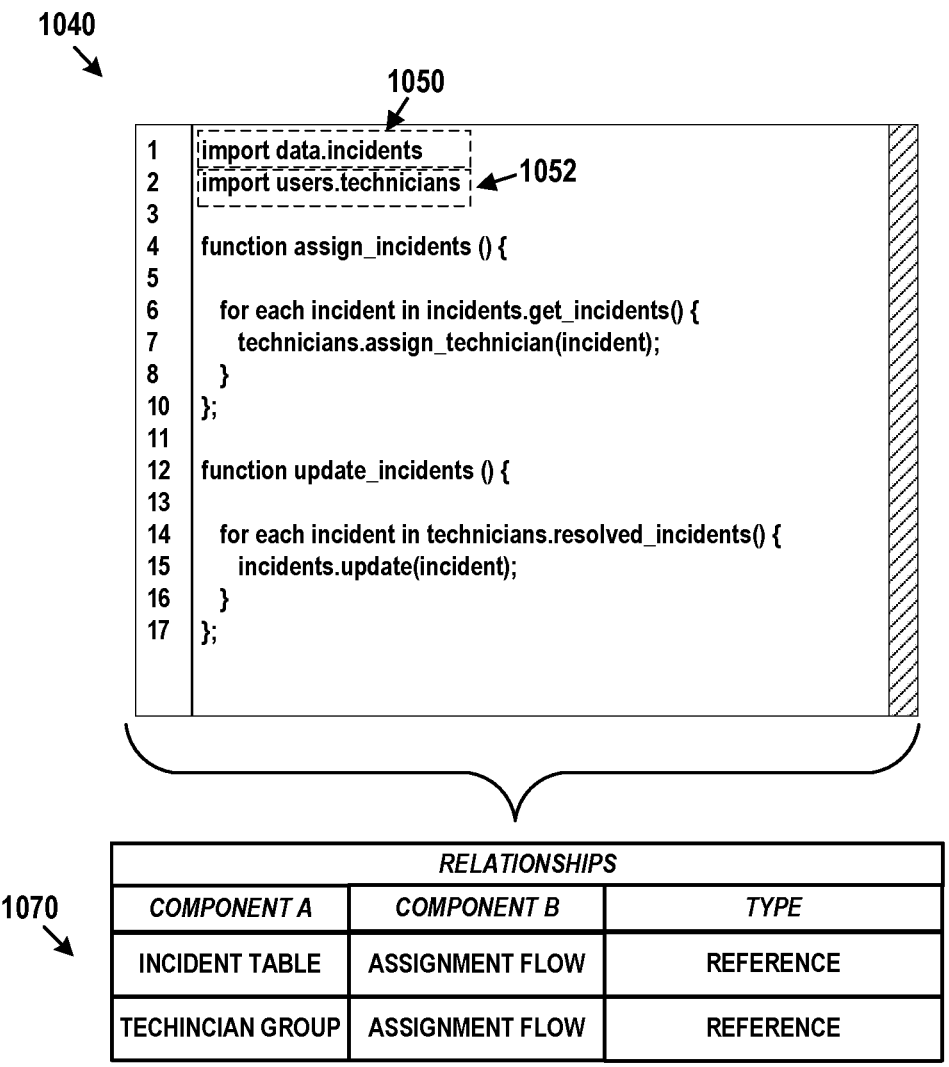
FIG. 10B depicts a source code file, in accordance with example embodiments.

As another example related to block 820, FIG. 10B depicts source code file 1040. For the purpose of example, source code file 1040 is shown to correspond to assignment flow 716. However, in practice, source code file 1040 may correspond to any one of application component(s) 640, including any one of data component(s) 650, GUI component(s) 660, functional(s) component 670, user group component(s) 680, or other type of application component. Source code file 1040 may be disposed within remote network management platform 320, perhaps in CMDB 500 or another database. In some examples, source code file 1040 can have more, fewer, and/or different types of content than indicated in FIG. 10B.

In example embodiments, application topology tool 620 could be configured to locate certain statements of interest within source code file 1040. These statements of interest may correspond to certain variable names, certain function names, or other types of statements.

For instance, as shown in FIG. 10B, source code file 1040 contains two import statements: import statement 1050, which imports "DATA.INCIDENTS" into source code file 1040, and import statement 1052, which imports "USERS.TECHNICIANS" into source code file 1052. During operations, application topology tool 620 could scan source code file 1040, locate those import statement, and determine that source code file 1040 contains references to "DATA.INCIDENTS" and "USERS.TECHNICIANS". Upon that determination, application topology tool 620 could conclude that application flow 716 has a relationship with incidents table 708 and a relationship with technician group 718.

Application topology tool 620 could then store those relationships in relationship table 1070. For instance, to capture the relationship between incidents table 708 and assignment flow 716, application topology tool 620 could add to relationship table 1070 an entry contains: (i) a reference to incidents table 708, (ii) a reference to assignment flow 716, and (iii) the type of relationship between incidents table 708 and assignment flow 716. Because assignment flow 716 refers to incidents table 708 in source code file 1040, the relationship type between incidents table 708 and assignment flow 716 may be considered as a "REFRENCE" relationship type. Similarly, to capture the relationship between technician group 718 and assignment flow 716, application topology tool 620 could add to relationship table 1070 an entry contains: (i) a reference to technician group 718, (ii) a reference to assignment flow 716, and (iii) the type of relationship between technician group 718 and assignment flow 716. Because assignment flow 716 refers to technician group 718 in source code file 1040, the relationship type between technician group 718 and assignment flow 716 may be considered as a "REFRENCE" relationship type.

During operations, application topology tool 620 could refer to the entries in relationship table 1070 to determine whether an edge should be displayed between the nodes of an application topology map. As discussed below, application topology tool 620 could visually depict a specific relationship type by using unique colors for the edges corresponding to that relationship type, using unique line format (e.g., a dash type, a line weight) for edges corresponding to that relationship type, or by including a textual description next to edges corresponding to that relationship type. For example, application topology tool 620 could visually distinguish a "reference" relationship between two application components using a blue color for the edge, using a solid line format for the edge, or by including a textual description next to the edge. Other ways of distinguishing relationship types are also possible.

Returning back to FIG. 8, at block 830, application topology tool 620 could determine one or more application topology map modifications. To do this, application topology tool 620 could refer to a pre-configured topology specification disposed within remote network management platform 320, although other ways of applying application topology map modifications are possible.

Figure 11:
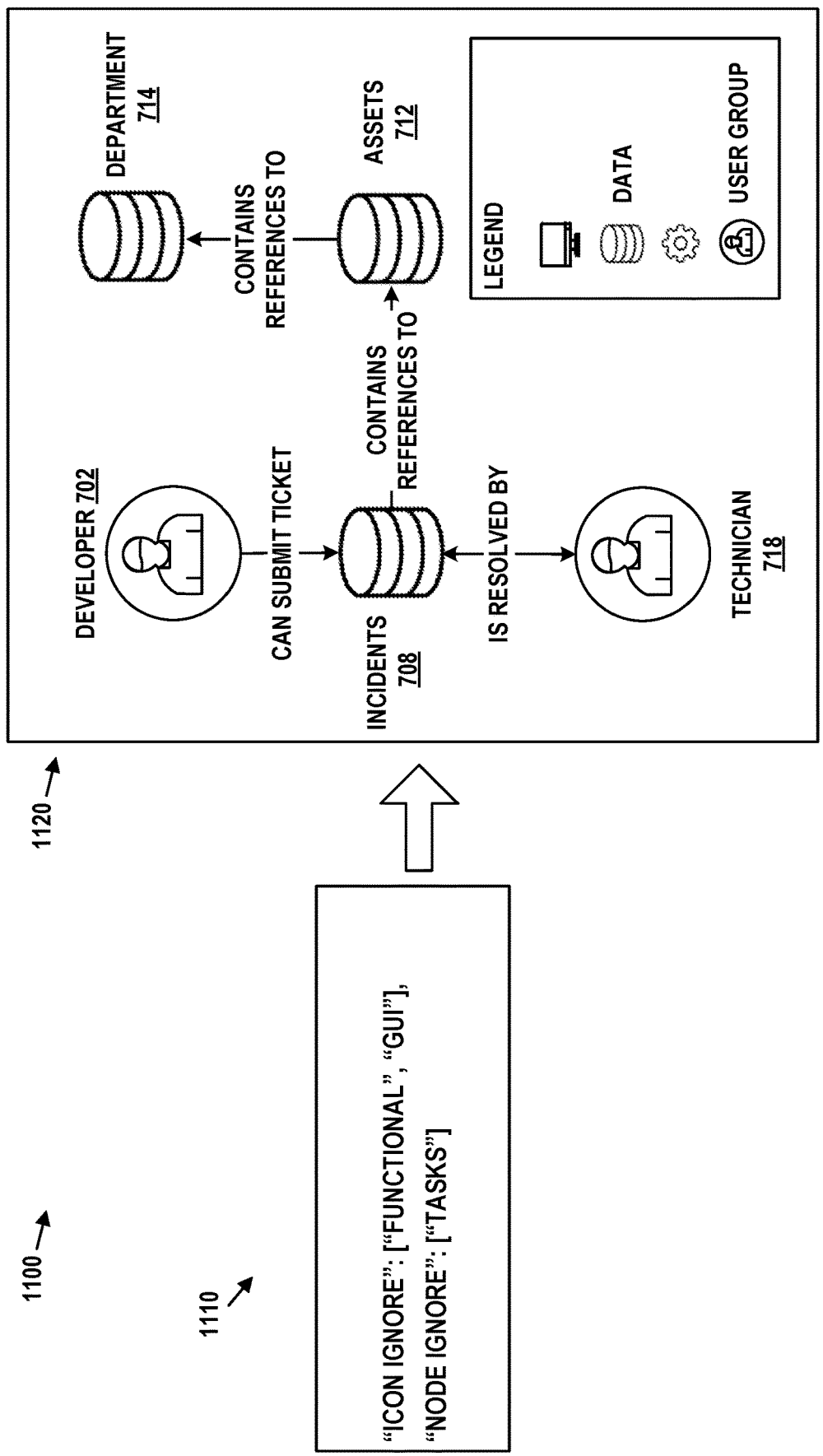
FIG. 11 illustrates a topology specification, in accordance with example embodiments.

As an illustrative example related to block 830, FIG. 11 shows an example scenario 1100 that contains topology specification 1110 and modified application topology map 1120.

Topology specification 1110 could be a file, database table(s), or the like that is disposed within remote network management platform 320 and associated with application 610. Remote network management platform 320 may prompt users 630 to enter appropriate data for topology specification 1110. This may be accomplished by way of a web page or series of web pages hosted by remote network management platform 320 and provided to users 630 upon request. The data entered into topology specification 1110 could specify modifications that application topology tool 620 should make when displaying application topology maps.

For example, topology specification 1110 is shown to include two data records: an array titled "ICON IGNORE" and an array titled "NODE IGNORE." The "ICON IGNORE" array contains two entries: "FUNCTIONAL" and "GUI". The "NODE IGNORE" array contains one entry: "TASKS". Application topology tool 620 could read the data records from topology specification 1110 to determine modifications that should be made when displaying an application topology map for application 610. In the example shown in FIG. 11, these modifications are represented by modified application topology map 1120, which may be a modified version of application topology map 700 from FIG. 7.

As may be seen by comparing application topology map 700 to modified application topology map 1120, modified application topology map 1120 does not include nodes that are associated with the display icon (e.g., developer portal 704 and technician portal 720). This modification may be the result of the "FUNCTIONAL" entry in the "ICON IGNORE" array of topology specification 1110. Additionally, modified application topology map 1120 does not include nodes that are associated with the gear icon (e.g., maintenance flow 706 and assignment flow 716). This modification may be the result of the "GUI" entry in the "ICON IGNORE" array of topology specification 1110. Further, modified application topology map 1120 does not include tasks table 710. This modification may be the result of the "TASKS" entry in the "NODE IGNORE" array of topology specification 1110.

Notably, the entries and arrangement of topology specification 1110 are merely used for example and are not intended to be limiting with respect to the embodiments herein. Other entries and arrangements of topology specification 1110 are also possible.

Returning back to FIG. 8, at block 840, application topology tool 620 could generate and display an application topology map using the results from blocks 810, 820, and 830. For example, application topology tool 620 could display could the application components identified at block 810 as nodes in the application topology map. Then, application topology tool 620 could display the determined relationship from block 820 as edges between the nodes. Concurrently, application topology tool 620 could use the modifications determined at block 830 to modified the edges/nodes. After the generating, application topology tool 620 could display the application topology map, perhaps on a graphical user interface, a web application, or the like.

VII. Example Operations

Figure 12:
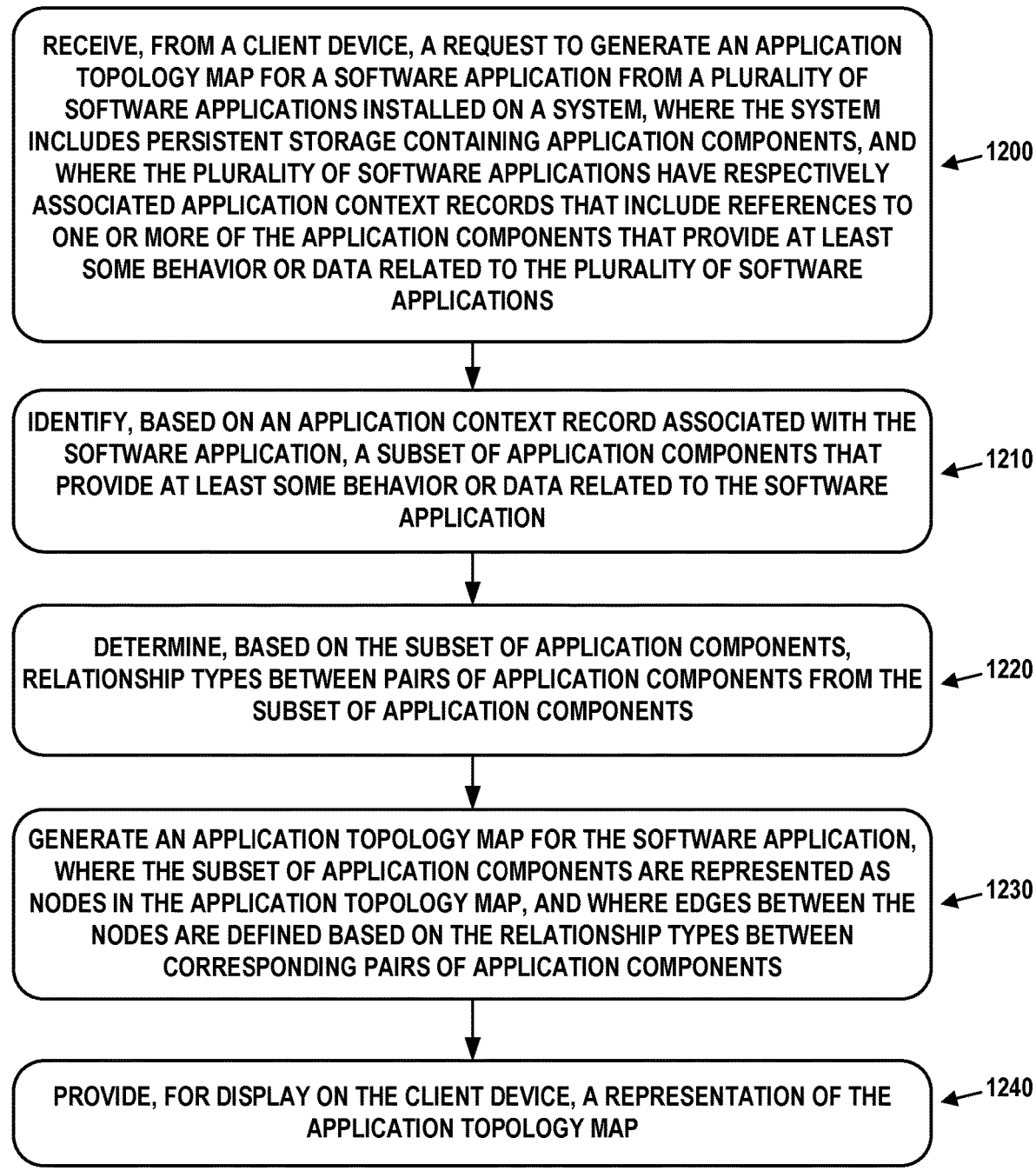
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform, one or more processors disposed within a remote network management platform, or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 involves receiving, from a client device, a request to generate an application topology map for a software application from a plurality of software applications installed on a system, where the system includes persistent storage containing application components, and where the plurality of software applications have respectively associated application context records that include references to one or more of the application components that provide at least some behavior or data related to the plurality of software applications.

Block 1210 involves identifying, based on an application context record associated with the software application, a subset of application components that provide at least some behavior or data related to the software application.

Block 1220 involves determining, based on the subset of application components, relationship types between pairs of application components from the subset of application components.

Block 1230 involves generating an application topology map for the software application, where the subset of application components are represented as nodes in the application topology map, and where edges between the nodes are defined based on the relationship types between corresponding pairs of application components.

Block 1240 involves providing, for display on the client device, a representation of the application topology map.

In some embodiments, the application components have associated application component types and generating the application topology map includes representing nodes for application components with unique icons per component type.

In some embodiments, generating the application topology map includes representing edges with unique colors or unique line types per relationship type.

In some embodiments, determining relationship types between pairs of application components includes: determining that a pair of application components from the subset of application components is stored in the persistent storage in a pair of database tables; and identifying a relationship type between the pair of application components based on a schema associated with the pair of database tables.

In some embodiments, determining relationship types between pairs of application components includes: determining that a first application component from the subset of application components is stored in the persistent storage at least in part as a source code file; locating statements within the source code file relating to a second application component from the subset of application components; and identifying a relationship type between the first application component and the second application component based on the statements within the source code file.

In some embodiments, the persistent storage contains a specification related to the software application. In such embodiments, the specification contains references to at least some of the application components in the subset of application components, and generating the application topology map involves omitting, from the application topology map, the application components referenced in the specification.

In some embodiments, at least one of the application components are pre-defined by the system.

In some embodiments, the references include pathnames to locations of the application components within the system.

In some embodiments, reception of the application topology map by the client device causes the client device to display the application topology map on a graphical user interface.

Some embodiments include receiving, from the client device, a second request to generate a second application topology map for a second software application from the plurality of software applications, where the second software application is different than the software application. Such embodiments may further include identifying, based on a second application context record associated with the second software application, a second subset of application components that provide at least some behavior or data related to the second software application. Such embodiments may even further include determining, based on the second subset of application components, relationship types between pairs of application components from the second subset of application components. Such embodiments may also include generating a second application topology map for the second software application, where the second subset of application components are represented as nodes in the second application topology map, and where edges between the nodes are defined based on the relationship types between corresponding pairs of application components from the second subset of application components. Such embodiments may additionally include providing, for display on the client device, a second representation of the second application topology map.

In some embodiments, the second subset of application components and the subset of application components share at least one application component.

In some embodiments, a system may include means for receiving, from a client device, a request to generate an application topology map for a software application from a plurality of software applications installed on the system. Such a system may include persistent storage containing application components, and where the plurality of software applications have respectively associated application context records that include references to one or more of the application components that provide at least some behavior or data related to the plurality of software applications. The system may also include means for identifying, based on an application context record associated with the software application, a subset of application components that provide at least some behavior or data related to the software application. The system may further include determining, based on the subset of application components, relationship types between pairs of application components from the subset of application components. The system may additionally include means for generating, an application topology map for the software application, wherein the subset of application components are represented as nodes in the application topology map, and wherein edges between the nodes are defined based on the relationship types between corresponding pairs of application components. The system may further include means for providing, for display on the client device, a representation of the application topology map.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising: persistent storage containing application components and a plurality of software applications installed on the system, wherein the plurality of software applications are available to a managed network in remote communication with the system, wherein the plurality of software applications have respectively associated application context records that include references to one or more of the application components that provide at least some behavior or data related to the plurality of software applications; and one or more processors configured to perform operations including: receiving, at a computational instance of the system, a request to generate an application topology map for a software application available to the managed network; identifying, by the computational instance based on an application context record available to the computational instance and associated with the software application, a subset of application components that provide at least some behavior or data related to the software application; determining, based on the subset of application components, relationship types between pairs of application components from the subset of application components; generating an application topology map for the software application, wherein the subset of application components are represented as nodes in the application topology map, and wherein edges between the nodes are defined based on the relationship types between corresponding pairs of application components; and providing, by the computational instance, a representation of the application topology map for display on a client device; and wherein determining relationship types between pairs of application components comprises: determining that a first application component from the subset of application components is stored in the persistent storage at least in part as a source code file; locating statements within the source code file relating to a second application component from the subset of application components; and identifying a relationship type between the first application component and the second application component based on the statements within the source code file.

2. The system of claim 1, wherein the application components have associated application component types, and wherein generating the application topology map includes representing nodes for application components with unique icons per component type.

3. The system of claim 1, wherein generating the application topology map includes representing edges with unique colors or unique line types per relationship type.

4. The system of claim 1, wherein determining relationship types between pairs of application components comprises:
 determining that a pair of application components from the subset of application components is stored in the persistent storage in a pair of database tables; and
 identifying a relationship type between the pair of application components based on a schema associated with the pair of database tables.

5. The system of claim 1, wherein the persistent storage contains a specification related to the software application, wherein the specification contains references to at least some of the application components in the subset of application components, and wherein generating the application topology map involves omitting, from the application topology map, the application components referenced in the specification.

6. The system of claim 1, wherein at least one of the application components are pre-defined by the system.

7. The system of claim 1, wherein the references comprise pathnames to locations of the application components within the system.

8. The system of claim 1, wherein reception of the application topology map by the client device causes the client device to display the application topology map on a graphical user interface.

9. The system of claim 1, wherein the operations further include:
 receiving a second request to generate a second application topology map for a second software application from the plurality of software applications, wherein the second software application is different than the software application;
 identifying, based on a second application context record associated with the second software application, a second subset of application components that provide at least some behavior or data related to the second software application;
 determining, based on the second subset of application components, relationship types between pairs of application components from the second subset of application components;
 generating a second application topology map for the second software application, wherein the second subset of application components are represented as nodes in the second application topology map, and wherein edges between the nodes are defined based on the relationship types between corresponding pairs of application components from the second subset of application components; and
 providing a second representation of the second application topology map for display on the client device.

10. The system of claim 9, wherein the second subset of application components and the subset of application components share at least one application component.

11. A computer-implemented method comprising: receiving, at a computational instance within a system, a request to generate an application topology map for a software application from a plurality of software applications installed on the system, wherein the plurality of software application are available to a managed network in remote communication with the system and, wherein the system includes persistent storage containing application components, and wherein the plurality of software applications have respectively associated application context records that include references to one or more of the application components that provide at least some behavior or data related to the plurality of software applications; identifying, by the computational instance utilizing an application context record associated with the software application, a subset of application components that provide at least some behavior or data related to the software application; determining, by the computational instance and based on the subset of application components, relationship types between pairs of application components from the subset of application components; generating, by the computational instance, an application topology map for the software application, wherein the subset of application components are represented as nodes in the application topology map, and wherein edges between the nodes are defined based on the relationship types between corresponding pairs of application components; providing, by the computational instance, a representation of the application topology map for display on a client device; and wherein determining relationship types between pairs of application components comprises: determining that a first application component from the subset of application components is stored in the persistent storage at least in part as a source code file; locating statements within the source code file relating to a second application component from the subset of application components; and identifying a relationship type between the first application component and the second application component based on the statements within the source code file.

12. The computer-implemented method of claim 11, wherein the application components have associated application component types, and wherein generating the application topology map includes representing nodes for application components with unique icons per component type.

13. The computer-implemented method of claim 11, wherein generating the application topology map includes representing edges with unique colors or unique line types per relationship type.

14. The computer-implemented method of claim 11, wherein determining relationship types between pairs of application components comprises:
   determining that a pair of application components from the subset of application components is stored in the persistent storage in a pair of database tables; and
   identifying a relationship type between the pair of application components based on a schema associated with the pair of database tables.

15. The computer-implemented method of claim 11, wherein the persistent storage contains a specification related to the software application, wherein the specification contains references to at least some of the application components in the subset of application components, and wherein generating the application topology map involves omitting, from the application topology map, the application components referenced in the specification.

16. The computer-implemented method of claim 11, further comprising:
   receiving a second request to generate a second application topology map for a second software application from the plurality of software applications, wherein the second software application is different than the software application;
   identifying, based on a second application context record associated with the second software application, a second subset of application components that provide at least some behavior or data related to the second software application;
   determining, based on the second subset of application components, relationship types between pairs of application components from the second subset of application components;
   generating a second application topology map for the second software application, wherein the second subset of application components are represented as nodes in the second application topology map, and wherein edges between the nodes are defined based on the relationship types between corresponding pairs of application components from the second subset of application components; and
   providing a second representation of the second application topology map for display on a client device.

17. The computer-implemented method of claim 16, wherein the second subset of application components and the subset of application components share at least one application component.

18. An article of manufacture including a non-transitory computer-readable medium, having stored thereon program instructions that, upon execution by one or more processors disposed within a computing system, cause the one or more processors to perform operations comprising: receiving, at a computational instance, a request to generate an application topology map for a software application from a plurality of software applications installed on a system, wherein the plurality of software application are available to a managed network in remote communication with the system, and wherein the system includes persistent storage containing application components, and wherein the plurality of software applications have respectively associated application context records that include references to one or more of the application components that provide at least some behavior or data related to the plurality of software applications; identifying, based on an application context record associated with the software application, a subset of application components that provide at least some behavior or data related to the software application; determining, based on the subset of application components, relationship types between pairs of application components from the subset of application components; generating, an application topology map for the software application, wherein the subset of application components are represented as nodes in the application topology map, and wherein edges between the nodes are defined based on the relationship types between corresponding pairs of application components; and providing, by the computation instance, a representation of the application topology map for display on a client device; and wherein determining relationship types between pairs of application components comprises: determining that a first application component from the subset of application components is stored in the persistent storage at least in part as a source code file; locating statements within the source code file relating to a second application component from the subset of application components; and identifying a relationship type between the first application component and the second application component based on the statements within the source code file.

* * * * *